(12) United States Patent
Yurgil

(10) Patent No.: US 8,055,422 B2
(45) Date of Patent: Nov. 8, 2011

(54) VEHICLE DECELERATION RATE CONTROL METHOD AND APPARATUS

(75) Inventor: James R. Yurgil, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 667 days.

(21) Appl. No.: 12/188,451

(22) Filed: Aug. 8, 2008

(65) Prior Publication Data

US 2010/0036575 A1 Feb. 11, 2010

(51) Int. Cl.
*B60L 7/22* (2006.01)
(52) U.S. Cl. .......... 701/70; 701/22; 701/78; 701/81
(58) Field of Classification Search .......... 701/70, 701/22, 78, 81
See application file for complete search history.

(56) References Cited

U.S. PATENT DOCUMENTS

| | | | |
|---|---|---|---|
| 6,691,013 B1 * | 2/2004 | Brown | 701/70 |
| 6,719,379 B2 * | 4/2004 | Crombrez | 303/152 |
| 7,167,783 B2 * | 1/2007 | Park et al. | 701/22 |
| 2005/0143877 A1 * | 6/2005 | Cikanek et al. | 701/22 |
| 2005/0143878 A1 * | 6/2005 | Park et al. | 701/22 |
| 2008/0100129 A1 * | 5/2008 | Lubbers | 303/113.1 |
| 2008/0103670 A1 * | 5/2008 | Jeon et al. | 701/81 |
| 2008/0140274 A1 * | 6/2008 | Jeon et al. | 701/22 |
| 2008/0210497 A1 * | 9/2008 | Jeon | 188/72.1 |

* cited by examiner

*Primary Examiner* — Joanne Silbermann
*Assistant Examiner* — Michael Stabley
(74) *Attorney, Agent, or Firm* — Quinn Law Group, PLLC

(57) ABSTRACT

A method of controlling a deceleration rate of a hybrid electric vehicle (HEV) includes measuring an applied regenerative braking torque (RBT) during a threshold regenerative braking event (RBE), and automatically applying an offsetting friction braking torque (OFBT) from a hydraulic braking system during the threshold RBE to provide the vehicle with a substantially constant deceleration rate. An HEV having a regenerative braking capability includes a friction braking system adapted to selectively apply an OFBT to slow the HEV in one manner, an energy storage system (ESS), an electric motor/generator, and a controller having a braking control algorithm or method. The method anticipates an impending let up in the RBT based on a plurality of vehicle performance values including a threshold vehicle speed, and selectively activates the friction braking system to apply the OFBT when the impending let up in the RBT is greater than a threshold.

15 Claims, 2 Drawing Sheets

| $I_{(x)}$ | Threshold Range/Value |
|---|---|
| N | 5 to 10 MPH |
| $B_F$ | 500 KPA + |
| GS | 2 - 1 DS; 2nd Gear |
| $TC_{Ratio}$ | 1 : 1 + |

VEHICLE DECELERATION RATE CONTROL METHOD AND APPARATUS

TECHNICAL FIELD

The present invention relates to a control method and apparatus for selectively controlling a friction braking level in a hybrid electric vehicle during a threshold transition, let up, or exit from a regenerative braking event.

BACKGROUND OF THE INVENTION

A hybrid electric vehicle (HEV) utilizes multiple sources of energy in order to improve fuel economy while reducing certain vehicle emissions. Typically, an HEV includes a rechargeable energy storage system (ESS), usually a battery or battery pack having a relatively high energy density, with the ESS being electrically connected to at least one of the multiple energy sources. The multiple energy sources most often include a gasoline or diesel internal combustion engine and at least one electric motor/generator. However, other HEV designs may alternately employ a fuel cell and/or another power source in place of the internal combustion engine in order to further reduce vehicle emissions.

In a typical "mild" hybrid design in particular, an energy conversion system, which is usually configured an internal combustion engine, provides the power necessary for propelling the HEV, with the engine being configured to shut off when the mild HEV is idle or at a standstill. In this manner fuel is conserved, particularly during stop-and-go traffic conditions. When a driver depresses an accelerator pedal to launch a mild HEV, an electric drive motor connected to an auxiliary battery provides an initial burst of power lasting through an interval required for cranking and starting the engine. The drive motor is not used to power the vehicle independently of the engine, as would a conventional or "full" HEV. However, a mild HEV may still be configured to provide regenerative braking and/or idle stop capabilities.

Regenerative braking is used on certain mild HEV as a means of capturing braking energy to further optimize fuel economy. A controller can select a first rotational direction of the electric motor/generator as needed to allow that device to act as a generator during a braking event. Acting as a generator, the ESS can be recharged while a negative torque is applied to the road wheels, thus slowing the HEV. Likewise, during normal driving operations the controller can select a second rotational direction of the electric motor/generator to allow that device to act as an electric motor for powering various systems aboard the HEV in conjunction with the ESS. Because regenerative braking improves overall fuel economy, it can be desirable to maximize both the magnitude and the duration of the regenerative braking during a given regenerative braking event.

In an automatic transmission aboard an HEV, a hydrodynamic torque converter assembly can provide a variable slip fluid coupling between an input shaft of the transmission and the power source or sources. Within certain torque converter assemblies, a lockup-style torque converter clutch (TCC) can be selectively engaged above a threshold speed, usually around 30 to 35 miles per hour (mph), in order to lock the pump/impeller and turbine members of the torque converter assembly. In this manner, slip is prevented at higher vehicle speeds.

Below this threshold speed, the TCC is disengaged to allow an increasing amount of slip to occur across the torque converter assembly. Coinciding with a fully-opened TCC at relatively low vehicle speeds, usually approximately 6 mph or less, a transition out of an active regenerative braking event occurs as the HEV is slowed to a standstill, or when the HEV is abruptly accelerated. When this occurs, the direction or sign of the total driveline torque, i.e., the sum of the engine torque and any transient electric motor torque supplied to the engine shaft from the motor/generator in its electric motor mode, transitions from a negative torque value to a neutral torque value or a positive torque value. Under certain circumstances, the transition or "let up" may produce a perceptible reduction in the vehicle deceleration rate.

SUMMARY OF THE INVENTION

Accordingly, a braking control method and apparatus are provided for selectively controlling a deceleration rate of an HEV under certain threshold conditions. The HEV has regenerative braking capability as described above, as well as a fixed-ratio hybrid transmission of the type known in the art. The braking control method and apparatus act in such a way that the driver or operator of the HEV does not readily perceive a change in the vehicle deceleration rate when the HEV is being operated under a predetermined vehicle mode. The method is executed only during the predetermined vehicle mode, and in particular when a regenerative braking torque (RBT) is rapidly or abruptly decreased prior to stopping the HEV.

In particular, the method is executed via the apparatus in order to thereby control a conventional electromechanical hydraulic braking system aboard the HEV under certain threshold conditions. The method measures an applied RBT during a threshold generative braking event, and applies an offsetting friction braking torque (OFBT) from the hydraulic braking system during the threshold regenerative braking event to thereby provide a constant deceleration rate during the threshold regenerative braking event. In one embodiment, the OFBT is applied at approximately the same magnitude and with an opposite sign to that of the RBT. The OFBT can be ramped out at different rates depending on the status of a braking input device or brake pedal, vehicle speed, and/or other factors.

Within the scope of the invention, an HEV is provided having the regenerative braking capability described above. The HEV includes a friction braking system for applying the OFBT to slow the HEV in one manner, an energy storage system (ESS), an electric motor/generator connected to the ESS for selectively applying an RBT to slow the HEV in another manner, and a controller. The controller has a braking control algorithm adapted to anticipate an impending let up in the RBT based on a plurality of vehicle performance values including a threshold vehicle speed, and to selectively activate the friction braking system to apply the OFBT when the impending let up in the RBT is greater than a predetermined threshold. In this manner, the braking control algorithm provides a substantially constant vehicle deceleration rate during the threshold let up in the RBT.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 3:
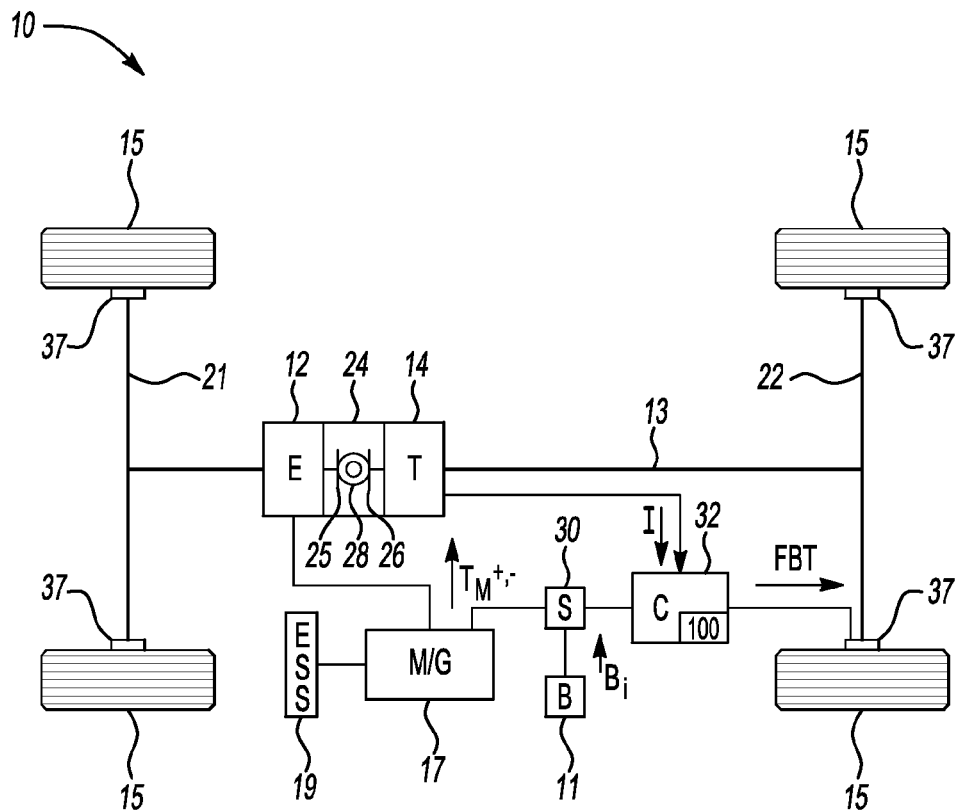
FIG. 1 is a schematic illustration of a hybrid electric vehicle (HEV) in accordance with the invention.
FIG. 3 is a table describing an exemplary set of threshold vehicle conditions usable with the braking control method of FIG. 2.

With reference to the Figures, wherein like reference numerals refer to like or similar components throughout the several figures, and beginning with FIG. 1, a mild hybrid electric vehicle (HEV) 10 has an energy conversion system (E) 12, a rechargeable electrical storage system (ESS), and at least one electric motor/generator 17. The energy conversion system 12 is drivingly connectable to an automatic transmission (T) 14 via a hydrodynamic torque converter assembly 24. The torque converter assembly 24 includes a driving member in the form of a pump or an impeller 25, a driven member in the form of a turbine 26, and a torque converter clutch (TCC) 28 operable for fully locking the impeller 25 and turbine 26 above a threshold speed, as will be understood by those of ordinary skill in the art.

The energy conversion system 12 can be configured as a gasoline, diesel, biodiesel, ethanol, or other style of internal combustion engine, or another suitable system within the scope of the invention. However configured, the energy conversion system 12 is capable of generating a sufficient amount or level of engine torque ($T_E$) for rotating an output or drive shaft 13 of the HEV 10, which ultimately rotates or powers a respective set of front and/or rear drive axles 21, 22 as needed. In this manner, the HEV 10 is propelled via a set of road wheels 15 using only the energy conversion system 12.

The motor/generator 17 can operate alternately as a power supplier or as a power generator. When operating as an electric motor or a power supplier, the motor/generator 17, which may be a single unit or multiple units depending on the design of the HEV 10, will supply power for cranking and starting the energy conversion system 12, with the energy conversion system 12 providing all of the necessary propulsive power after starting. When operating as a generator, the motor/generator 17 will generate electrical power for storage in the ESS 19. An electronic control unit or controller 32 is therefore adapted to route or distribute energy from the motor/generator 17 to the ESS 19 for recharging/storage therein, and/or to distribute the energy to another electrical power unit (not shown), which will be operating as a motor at that time.

Still referring to FIG. 1, the HEV 10 includes a conventional electro-mechanical or hydraulic friction braking system 37, such as a fluid-actuated pad and/or drum style braking system, which is positioned in proximity to each wheel 15 and adapted to provide a frictional mechanical braking capability, which can be augmented by the electronic/regenerative braking capability described above. Ordinarily, the friction braking system 37 is the primary or sole braking system when the HEV 10 is traveling at a relatively high rate of speed.

The motor/generator 17 is also configured to operate as a source of electric motor torque, abbreviated $T_M$ in FIG. 1. The electric motor torque ($T_M$) can be reversed in direction or sign as needed, as indicated by the +, − notation in FIG. 1, in order to enable provide positive or negative motor torque as needed. When braking during a regenerative braking event, for example, the motor/generator 17 is reversed in rotational direction to deliver a negative torque or drag to the wheels 15. The motor/generator 17 is electrically connected to the ESS 19, so the ESS 19 can be recharged when the motor/generator 17 is acting as a generator. Likewise, when acting as an electric motor, the motor/generator 17 can draw energy from the ESS 19 to assist in cranking the energy conversion system 12 to enable shut down of the energy conversion system 12 during idling conditions. For optimal utility, the ESS can be configured as a rechargeable nickel-metal hydride, lithium ion, or other suitable electro-chemical device such suitable for use as a battery or a battery pack, and/or to an electro-chemical capacitor module having a relatively high energy density.

The controller 32 therefore utilizes the dual motor/generator capabilities of the motor/generator 17 to achieve the regenerative braking capability, and can therefore selectively slow or stop the HEV 10 during a regenerative braking event by reversing the rotational direction of the motor/generator 17 to establish a power generating mode. Simultaneously, a substantial portion of the expended braking energy is converted into useful electricity and stored within the ESS 19.

One or more sensors (S) 30 can be operatively attached to the motor/generator 17, the energy conversion system 12, and to a brake input device (B) 11, such as a depressible brake pedal, which is operable for imparting a detectable and/or measurable braking input signal (Bi). The braking input signal (Bi) describes the dynamic and static conditions or positional/functional state of the brake input device 11, such as but not limited to an amount of operator-applied braking force or pressure exerted on the brake input device 11, the amount or distance of travel of the brake input device 11 within its range of motion, the apply rate, etc.

The controller 32 translates the braking input signal (Bi), and in particular the brake pedal "effort" as measured in units of force, pressure, and/or rotation, into a driver-intended brake torque level, abbreviated BTL hereinafter for simplicity. The BTL can be used to selectively adjust an applied offsetting friction braking torque, abbreviated OFBT in FIG. 1 and hereinafter for simplicity, as described below. The sensor 30 is therefore configured to detect, measure, or otherwise determine each of the magnitude and the direction/sign of the regenerative braking torque (RBT) being applied during a regenerative braking event. Also, the sensor 30 detects, measures, or otherwise determines the detected force, travel, rotation, etc. describing the braking level Bi, as well as a plurality of vehicle input signals as discussed below. As a single sensor 30 is unlikely to possess the capability of measuring all of these values, multiple sensors 30 can be positioned as needed in the HEV 10 to collect the required values.

As is known in the control of power transmissions such as the transmission 14, the controller 32 receives a number of electrical signals (arrow I) describing a data input set, i.e., a plurality of vehicle performance values from the HEV 10 and the transmission 14, such as but not limited to: engine speed, engine torque ($T_E$), electric motor torque ($T_M$), throttle demand, braking input level (Bi), vehicle speed (N), the magnitude and sign of the various braking torques, etc. These electrical signals are collected or determined via the one or more sensors 30 and relayed as input signals to the controller 32. In particular, the data input set is usable by a braking control algorithm or method 100 resident within or accessible by the controller 32 for controlling a deceleration rate of the HEV 10 during a predetermined or threshold vehicle mode, as will now be described with reference to FIGS. 2 and 3.

Figure 2:
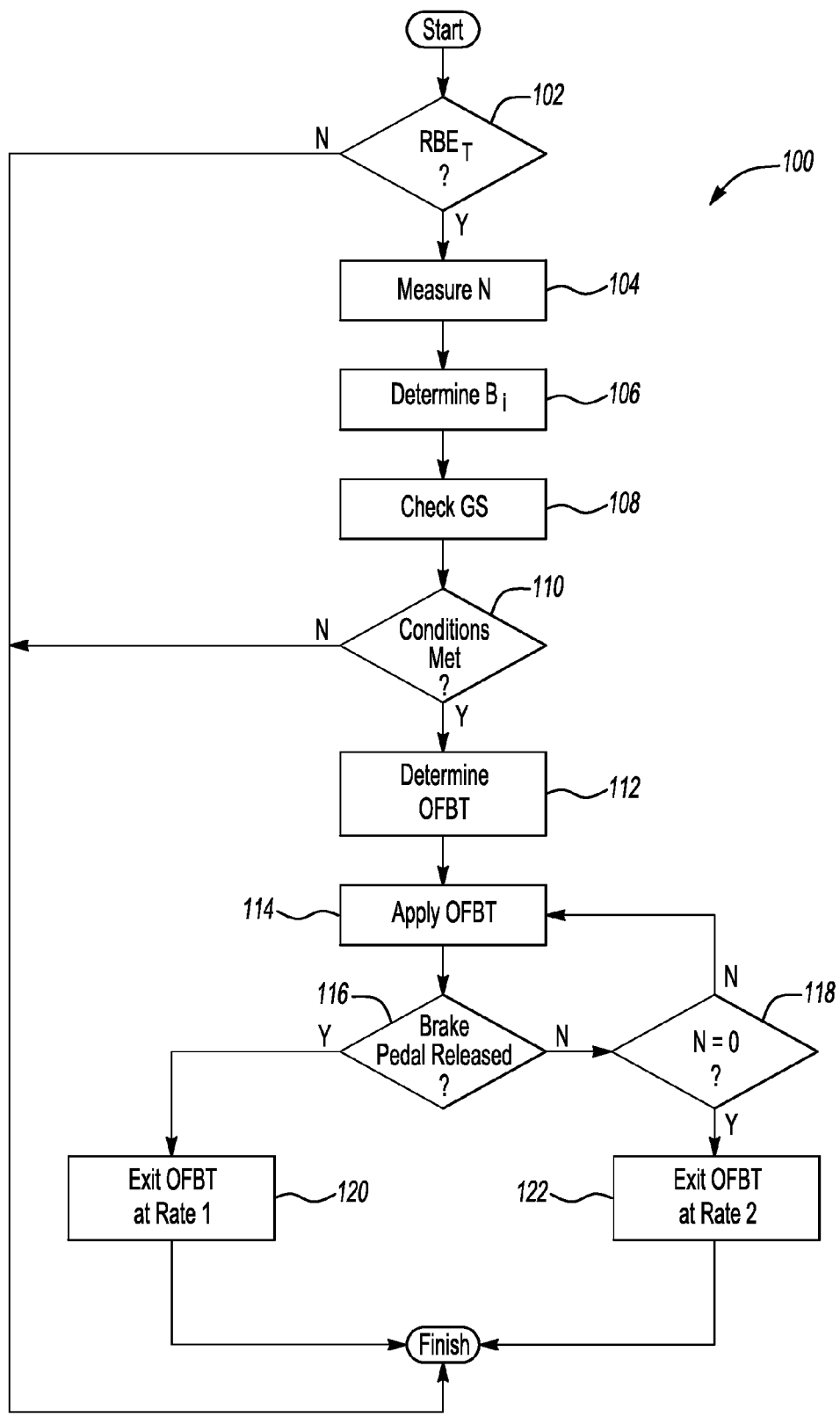
FIG. 2 is a schematic flow chart describing a braking control algorithm or method usable with the HEV of FIG. 1.

Referring to FIG. 2, the braking control algorithm or method 100 begins at step 102, wherein the controller 32 of FIG. 1 determines whether a threshold regenerative braking event ($RBE_T$) is active. Within the scope of the invention, the $RBE_T$ is present when a regenerative braking mode is being exited, or when such an exit is imminent, that corresponds to a threshold change in braking torque. That is, the $RBE_T$ is present when the RBT presented by the total powertrain torque ($T_E+T_M$) is presently or imminently transitioning from a threshold negative torque value, such as approximately −15 to −20 Newton meters (Nm) or more in one embodiment, to a positive or a neutral torque value, an event that can be generally coincident with an opening of the TCC 28 of FIG. 1 at relatively low vehicle speeds.

At step 102, therefore, the controller 32 of FIG. 1 therefore measures, detects, monitors, or otherwise determines both the magnitude and direction/sign of the present or active regenerative braking torque (RBT). A representative set of conditions indicative of an imminent transition are discussed below with reference to FIG. 3. The method proceeds to step 104 if the threshold regenerative braking event ($RBE_T$) is present. However, if the $RBE_T$ is not active, the method 100 is finished, and the braking of the HEV 10 of FIG. 1 is operated and controlled in the customary manner, such as but not limited to control via an overall braking control algorithm (not shown).

At step 104, the speed (N) of the HEV 10 is measured, detected, or otherwise determined, such as by using the sensor or sensors 30 of FIG. 1. Once the speed (N) of the HEV 10 has been determined, the method 100 proceeds to step 106.

At step 106, the braking input signal (Bi) of the HEV 10 is measured, detected, or otherwise determined at the braking input device 11, such as by using the sensor or sensors 30 of FIG. 1. In particular, the controller 32 of FIG. 1 determines the braking force and travel applied to the braking input device 11. Once the braking input signal (Bi) has been determined, the method 100 proceeds to step 108.

At step 108, the gear status (GS) of the HEV 10 is measured, detected, or otherwise determined using any suitable means. For example, the controller 32 of FIG. 1 can directly or indirectly verify the gear status using the engine speed, torque converter ratio, lookup tables, etc. Once the gear status has been determined, the method 100 proceeds to step 110.

At step 110, the values collected at steps 102-108 are compared to a calibrated set of corresponding threshold data or a threshold range of data. If predetermined conditions are met for continuing further with the method 100, the method 100 proceeds to step 112. Otherwise, the method 100 is finished.

Referring briefly to FIG. 3, an exemplary data input set or set of vehicle performance values ($I_x$) usable with the method 100 of FIG. 2 is shown with corresponding threshold values. The exemplary vehicle performance values ($I_x$) can include the vehicle speed (N), the braking pressure or force (BF) exerted on the brake input device 11 of FIG. 1, the gear state (GS) of the HEV 10 of FIG. 1, the torque converter ratio (TC ratio) of the torque converter assembly 24 of FIG. 1, and the regenerative braking torque (RBT) of the HEV 10 of FIG. 1, although other vehicle conditions that are sufficiently indicative of an impending exit of a regenerative braking event can be used within the scope of the invention.

In one embodiment, the threshold vehicle speed (N) can be approximately 5 to 10 mph, with a value of approximately 6 mph typically corresponding to an imminent exit from a regenerative braking event. The threshold for the braking force (BF) can set at a level high enough to minimize the occurrence of false positive errors, which might occur when an operator is inadvertently resting a foot on the brake input device 11 without actually intending to apply the brakes, or when a light application of force is intended. A level of approximately 500 kPa is a typical lower threshold for a moderate amount of force exerted on the brake input device 11, although other threshold values could be selected depending on the design of the HEV 10 of FIG. 1. From the braking input signal (Bi), an operator-exerted force or brake pedal "effort" applied to the brake input device 11, as measured in units of force, pressure, and/or rotation, can be used to determine a driver-intended or requested brake torque level (RBTL). This value remains accessible by the controller 32 of FIG. 1 during step 114, as described below.

Likewise, the gear state (GS) can be a detected or otherwise determined. For instance, the method 100 can include determining whether the transmission 14 of FIG. 1 is positioned in drive, in second gear, and/or is executing a 2-1 downshift, second gear, or other drive gear status ordinarily coincident with an imminent or impending exit from a threshold regenerative braking event. Finally, the TC ratio can be sufficiently greater than 1:1, a ratio which would indicate a fully released TCC 28.

Referring again to FIG. 2, and resuming with step 112, an offsetting friction braking torque (OFBT) is calculated or otherwise determined using the RBT determined in step 102. As the RBT has a fluctuating value, the RBT is continuously or periodically monitored by the controller 32 for use in step 114 as discussed below. The value for the OFBT is of the same magnitude as that of the RBT, or within an allowable range thereof. The value for the OFBT has a direction or sign that is opposite that of the RBT. That is, the RBT is a negative torque, while the OFBT is a positive torque. Once the OFBT is determined, the method 100 proceeds to step 114.

Steps 114 through 122 are directed toward providing continuous vehicle deceleration rate control of the HEV 10 of FIG. 1, while simultaneously monitoring various vehicle conditions for an exit point, i.e., a point in time at which the controller 32 will terminate execution of the method 100 and, if so equipped, return to a larger vehicle control algorithm (not shown) to govern braking of the HEV 10 of FIG. 1 outside of the threshold conditions. In general, the method 100 includes continuously monitoring the set of data input conditions or vehicle performance values (I) of FIG. 1 to determine the driver-intended or requested brake torque level (RBTL) so as to ascertain an "expected" vehicle deceleration rate. The method 100 controls the apply rate of the frictional braking system 37 of FIG. 1 to compensate for the let-off in the RBT when the TCC 28 of FIG. 1 is released, and/or during another state or condition of the HEV 10 of FIG. 1 indicative of an impending let-off in the RBT. Accordingly, using steps 114-122, the vehicle deceleration rate is held substantially constant during the predetermined RBE (see step 102).

At step 114 in particular, the method 100 includes automatically applying the OFBT values determined at step 112 by selectively controlling the friction braking system 37 of FIG. 1 as needed. As the RBT is expected to rapidly vary as the regenerative braking event is exited or let off, the OFBT is likewise continuously varied by the controller 32 to ensure a substantially constant vehicle deceleration rate during the threshold conditions described above. As the OFBT determined at step 112 is being applied, the method 100 proceeds to step 116.

At step 116, the set of input values (I) of FIG. 1, exemplified by the values I(x) of FIG. 3 discussed above, are monitored to determine whether a predetermined braking condition is present. According to one embodiment, the predetermined braking condition corresponds to a release of the brake input device 11 of FIG. 1, such as would occur when an operator of the HEV 10 of FIG. 1 moves a foot from a brake pedal to an accelerator pedal prior to launch. Release of the brake input device 11 can be detected, measured, or determined using the sensor 30 of FIG. 1 by measuring a force and/or travel of the brake input device 11. If predetermined braking condition is present, i.e., if the brake pedal or other brake input device 11 has been released, the method 100 proceeds to step 120. Otherwise, the method 100 proceeds to step 118.

At step 118, the method 100 verifies whether the vehicle speed (N) determined at step 104 is equal to zero. If N is equal to zero, and having previously determined at step 116 that the brake input device 11 remains applied, the method 100 proceeds to step 122. Otherwise, the method 100 repeats step 114 as described above.

At step 120, having determined at step 116 that the brake input device 11 of FIG. 1 has been released, the method 100 discontinues, exits, or lets off the application of the OFBT of step 114 at a first rate, i.e., Rate 1 in FIG. 2. Rate 1 can be a relatively rapid rate in comparison to a baseline apply rate, which in the absence of an applied pressure to the brake input device 11 should not be readily perceived through the brake input device 11 by an operator of the HEV 10. The OFBT is therefore discontinued, exited, or let off at Rate 1, and the method 100 is finished. At step 122, it having been determined at steps 116 and 120, respectively, that the brake input device 11 has been released and the vehicle speed (N) is equal to zero, the OFBT applied at step 114 is exited or discontinued at a second predetermined rate, or Rate 2 in FIG. 2. That is, with a braking input device 11 applied, an operator or driver of the HEV 10 of FIG. 1 is more likely to feel or perceive disturbances in let up of the RBT, and therefore a relatively gradual release of the OFBT may provide a more desirable brake pedal feel. After exiting the OFBT at Rate 2, the method 100 is finished. While the best modes for carrying out the invention have been described in detail, those familiar with the art to which this invention relates will recognize various alternative designs and embodiments for practicing the invention within the scope of the appended claims.

The invention claimed is:

1. A method of controlling a deceleration rate of a hybrid electric vehicle (HEV) having a friction braking system and a regenerative braking capability, the method comprising:
    measuring an applied regenerative braking torque (RBT) during a threshold regenerative braking event (RBE); and
    automatically applying an offsetting friction braking torque (OFBT) from said hydraulic braking system during said threshold RBE to thereby offset said RBT, and to thereby provide the HEV with a substantially constant deceleration rate;
    wherein said OFBT has a first magnitude and a first sign; and
    wherein said RBT has a second magnitude that is approximately equal to said first magnitude and a second sign that is opposite said first sign.

2. The method of claim 1, further comprising:
    determining a speed of the HEV, wherein said second magnitude and said second sign of said RBT is measured and said OFBT is applied to offset said RBT only when said speed of the HEV is less than a threshold speed.

3. The method of claim 1, further comprising:
    measuring a braking input level, wherein said second magnitude and said second sign of said RBT is measured and said OFBT is applied to offset said RBT only when said braking input level exceeds a threshold braking level.

4. The method of claim 1, wherein the vehicle includes an automatic transmission having a hydrodynamic torque converter assembly, the method further comprising: determining a ratio of the hydrodynamic torque converter assembly, wherein said second magnitude and said second sign of said RBT is measured and said OFBT is applied to offset said RBT only when said ratio exceeds a threshold ratio.

5. The method of claim 1, including a brake input device, further comprising: discontinuing application of the OFBT at a first rate when the brake input device is released; and
    discontinuing application of the OFBT at second rate when the brake input device is applied and when the HEV has a zero speed;
    wherein the second rate is less than the first rate.

6. A method of controlling a deceleration rate of a hybrid electric vehicle (HEV) having a friction braking system and a regenerative braking capability, the method comprising:
    determining a magnitude and a sign of an applied regenerative braking torque (RBT) during a threshold regenerative braking event (RBE), wherein said threshold RBE is an impending threshold torque let up in said applied RBT;
    measuring a plurality of vehicle performance values;
    comparing said plurality of vehicle performance values to corresponding threshold ranges; and
    automatically applying an offsetting friction braking torque (OFBT) from the friction braking system when each of said plurality of vehicle performance values are within a respective one of said corresponding threshold ranges;
    wherein said OFBT provides the HEV with a substantially constant deceleration rate during said impending torque let up.

7. The method of claim 6, wherein said OFBT is equal in magnitude to said RBT, and is opposite in sign to said RBT.

8. The method of claim 6, wherein determining said plurality of vehicle performance values includes measuring at least one of: a speed of the HEV and a braking input level.

9. The method of claim 6, wherein the HEV includes an automatic transmission having a hydrodynamic torque converter assembly; and
    wherein determining said plurality of vehicle performance values includes at least one of: determining a ratio of the hydrodynamic torque converter assembly and determining a gear state of the automatic transmission.

10. The method of claim 6, including a braking input device, the method further comprising:
    discontinuing application of said OFBT at a first rate when the braking input device is released; and
    discontinuing application of said OFBT at second rate when the braking input device is applied and when the HEV has a zero speed;
    wherein said second rate is less than said first rate.

11. The method of claim 6, wherein said threshold impending torque let up is greater than approximately 15 to 20 Nm.

12. The method of claim 6, wherein said plurality of vehicle performance values includes a vehicle speed, and wherein said corresponding threshold ranges includes a vehicle speed range of approximately 0 to 10 mph.

13. A hybrid electric vehicle (HEV) having a regenerative braking capability, the HEV comprising:
    a friction braking system configured to selectively and automatically apply an offsetting friction braking torque (OFBT) to thereby slow the HEV in one manner;
    an energy storage system (ESS);
    an electric motor/generator electrically connected to said ESS and operable for selectively applying a regenerative braking torque (RBT) to thereby slow the HEV in another manner; and a controller configured for measuring the applied RBT during a threshold regenerative braking event (RBE), and for automatically applying the OFBT with a first magnitude and sign via the friction braking system during said threshold RBE to thereby offset said RBT, which has a second magnitude that is approximately equal to the first magnitude and a second sign that is opposite the first sign, thereby providing a substantially constant vehicle deceleration rate.

14. The HEV of claim 13, including a brake pedal, wherein said controller is configured to apply said OFBT at a first rate when said brake pedal is released, and at a second rate when said brake pedal is applied and a speed of the HEV is zero;
wherein said second rate is less than said first rate.

15. The HEV of claim 14, including a hydrodynamic torque converter assembly having a lockup clutch.

* * * * *